United States Patent
Eichhorn

(10) Patent No.: US 9,112,434 B2
(45) Date of Patent: Aug. 18, 2015

(54) DEVICE FOR CONVERTING KINETIC ENERGY INTO ELECTRICAL ENERGY

(76) Inventor: Karl Eichhorn, Vienna (AT)

(*) Notice: Subject to any disclaimer, the term of this patent is extended or adjusted under 35 U.S.C. 154(b) by 55 days.

(21) Appl. No.: 13/702,935

(22) PCT Filed: May 30, 2011

(86) PCT No.: PCT/AT2011/000245
§ 371 (c)(1),
(2), (4) Date: Mar. 19, 2013

(87) PCT Pub. No.: WO2011/153563
PCT Pub. Date: Dec. 15, 2011

(65) Prior Publication Data
US 2013/0207403 A1    Aug. 15, 2013

(30) Foreign Application Priority Data
Jun. 7, 2010   (AT) .................................. A 924/2010

(51) Int. Cl.
| F02B 63/04 | (2006.01) |
| F03G 7/08 | (2006.01) |
| H02K 7/18 | (2006.01) |
| B63H 1/00 | (2006.01) |
| B63H 3/00 | (2006.01) |
| B63H 5/00 | (2006.01) |
| B63H 7/00 | (2006.01) |
| B64C 11/00 | (2006.01) |
| B64C 27/00 | (2006.01) |
| F01D 25/00 | (2006.01) |
| F04D 29/00 | (2006.01) |
| B64C 11/06 | (2006.01) |
| B64C 11/30 | (2006.01) |
(Continued)

(52) U.S. Cl.
CPC ................ *H02N 11/002* (2013.01); *F03G 3/06* (2013.01); *F03G 7/08* (2013.01)

(58) Field of Classification Search
CPC ........... F03B 13/182; F03G 7/08; F03G 7/10; F03G 3/06; H02K 7/1876; F05B 2260/504; B60K 25/10; F16F 15/315
USPC ....... 290/1 R, 42, 53; 416/144–145, 147–148
See application file for complete search history.

(56) References Cited

U.S. PATENT DOCUMENTS 4,452,045 A * 6/1984 Matlin et al. .................. 60/641.8
4,852,350 A * 8/1989 Krisko ............................ 60/325
(Continued)

FOREIGN PATENT DOCUMENTS

| GB | 109 123 | 9/1917 |
| GB | 2234637 A * | 2/1991 |
(Continued)

*Primary Examiner* — Tulsidas C Patel
*Assistant Examiner* — Charles Reid, Jr.
(74) *Attorney, Agent, or Firm* — Cozen O'Connor

(57) ABSTRACT

A device for converting kinetic energy into electrical energy, having a pendulum which includes a pendulum rod and a pendulum weight and is suspended in oscillating fashion on a shaft, a generator connected to the shaft and configured to convert the rotational energy of the pendulum into electrical energy, and means by which the pendulum is rigidly connected to the shaft when it oscillates in a predetermined direction. The pendulum is suspended in a tiltable frame, the tilt axis of which is located below an oscillation path of the pendulum and parallel to the pendulum axis. A push rod of a hydraulic or pneumatic drive cylinder supplied with energy for the pendulum drive is connected to the frame, and the drive cylinder is pivotably connected to the elements of the device that convert the electrical energy.

8 Claims, 6 Drawing Sheets

(51) Int. Cl.
*B64C 27/02* (2006.01)
*B64C 27/52* (2006.01)
*H02N 11/00* (2006.01)
*F03G 3/06* (2006.01)

(56) References Cited

U.S. PATENT DOCUMENTS 7,151,322 B2 * 12/2006 Eskandr .................. 290/1 R
2005/0248159 A1 * 11/2005 Seoane .................. 290/1 R
2010/0123313 A1 * 5/2010 Hobdy .................... 290/42

FOREIGN PATENT DOCUMENTS

| RO | 122 313 | 3/2009 |
| SU | 735 822 | 5/1980 |
| WO | WO 2005/024227 | 3/2005 |
| WO | WO 2008/077164 | 7/2008 |
| WO | WO 2009/004645 | 1/2009 |
| WO | WO 2010/056956 | 5/2010 |

* cited by examiner

DEVICE FOR CONVERTING KINETIC ENERGY INTO ELECTRICAL ENERGY

RELATED APPLICATIONS

This is a U.S. National Phase Application under 35 USC 371 of International Application PCT/AT2011/000245 filed on May 30, 2011.

This application claims the priority of Austrian application no. A 924/2010 filed Jun. 7, 2010, the entire content of which is hereby incorporated by reference.

FIELD OF THE INVENTION

The invention relates to a device for converting kinetic energy into electrical energy, having a pendulum which includes a pendulum rod and a pendulum weight and is suspended in oscillating fashion on a shaft, and also having a generator which is connected to the shaft and by means of which the rotational energy of the pendulum can be converted into electrical energy, and furthermore a means is provided by which the pendulum is rigidly connected to the shaft when it oscillates in a predetermined direction.

BACKGROUND OF THE INVENTION

Devices of this type are suitable for converting potential and kinetic energy, in particular pulselike energy, into electrical energy, where that type of energy is lacking. They can moreover be used as presentation models, as a technical toy, or as instruction models for illustrating energy conversions and efficiencies.

International patent disclosure WO 2005/024227 A1 discloses a mechanism for generating energy that has two parallel-suspended pendulums, which drive a generator via a coupling gear at their pivot point. The pendulums each receive the oscillation energy from two kicker drives. When one pendulum reaches the predetermined point of maximum deflection, it is given a push from the kicker located there, and then swings back with increased energy. One disadvantage of this construction is that each pendulum has two kicker drives, which is complicated and expensive. Moreover, the pendulums can oscillate only at a single energy level, which is defined by the invariable deflection angle up to the kick position. If a form of energy is not ideally present in pulselike form, then it must be converted in pulselike fashion to drive the mechanism, and this is another disadvantage. Also, mechanical wear occurs at the kicker drives and kicker faces of both pendulums. Finally, the kicker drive type is a disadvantageous source of loud noise.

Austrian patent disclosure AT 504 707 A1 discloses a centrifugal-force machine for converting kinetic energy into electrical energy by means of a double pendulum, which drives a generator via a coupling gear at its upper pivot point. The double pendulum receives its oscillation energy from two adjusting cylinders, which via lever arms on the upper part of the double pendulum cause the double pendulum to buckle. By means of suitable regulation of the adjusting cylinders, the double pendulum oscillates without external mechanical action being exerted on it. The disadvantage of this embodiment is that the energy to be converted, such as compressed air, must be delivered to the oscillating pendulum from outside. That would require flexible hoses, for example, which damp the oscillation and are parts that wear. Moreover, the double pendulum is complicated in its construction and requires complicated regulation in order not to oscillate chaotically. If it were to oscillate chaotically, then although electrical energy would be generated, that would happen irregularly and would have to be buffered and smoothed out by additional means.

U.S. Pat. No. 4,852,350 teaches an energy generator. In one embodiment, the rotational energy of a motor is converted into kinetic energy of a pendulum, which in turn is converted into potential energy of a fluid under pressure, and that energy in turn, upon expansion of the fluid in a turbine, finally drives a rotating generator, which generates current. In a further embodiment of U.S. Pat. No. 4,852,350, the rotational energy is transmitted by means of a connecting rod to oscillating pendulums, whose ends in their outward-pivoted position are given an additional input of energy by springs. The pendulums moved in this manner introduce their kinetic energy in turn into the generator by means of a connecting rod. A disadvantage of this teaching is that electrical energy is present both at the beginning and at the end of the energy conversion chain. Accordingly, converting a first form of energy overall into the other is not contemplated. It is also disadvantageous that complicated mechanical constructions are required, which reduce the efficiency.

SUMMARY OF THE INVENTION

One object of the invention is to create a device of the type described at the outset which has a simple construction and as a result has low friction and other losses and thus has high efficiency. A further object is to convert forms of kinetic energy that are not ideally pulselike.

The device according to an embodiment of the invention includes a pendulum rod that is connected via a push rod to a hydraulic or pneumatic drive cylinder supplied with energy for the pendulum drive, and the drive cylinder is pivotably connected to the elements of the device that convert the electrical energy via a push rod fixation.

In an alternative embodiment, the pendulum is suspended in a tiltable frame, the tilt axis of which is located below an oscillation path of the pendulum and parallel to the pendulum axis, and a push rod of a hydraulic or pneumatic drive cylinder supplied with energy for the pendulum drive is connected to the frame, and the drive cylinder is pivotably connected to the elements of the device that convert the electrical energy.

In a further embodiment of the invention, the shaft has a shaft disk fixedly connected to it, and the pendulum rod has at least one jaw caliper and at least one gripper jaw retained movably in the jaw caliper, by which gripper jaw the pendulum rod can be connected rigidly to the shaft via the shaft disk. In a further embodiment of the invention, the pendulum rod is connected rotatably to the shaft disk.

Preferably, the drive cylinder is periodically actuatable via an associated regulator.

In another feature of the invention, the device has a flywheel, which is drivable by the shaft in order to effect an enhanced uniform rotary speed of the shaft.

In a further embodiment of the invention the device has two or more pendulums, which are located parallel on the shaft.

DETAILED DESCRIPTION OF THE DRAWINGS

Figure 1:
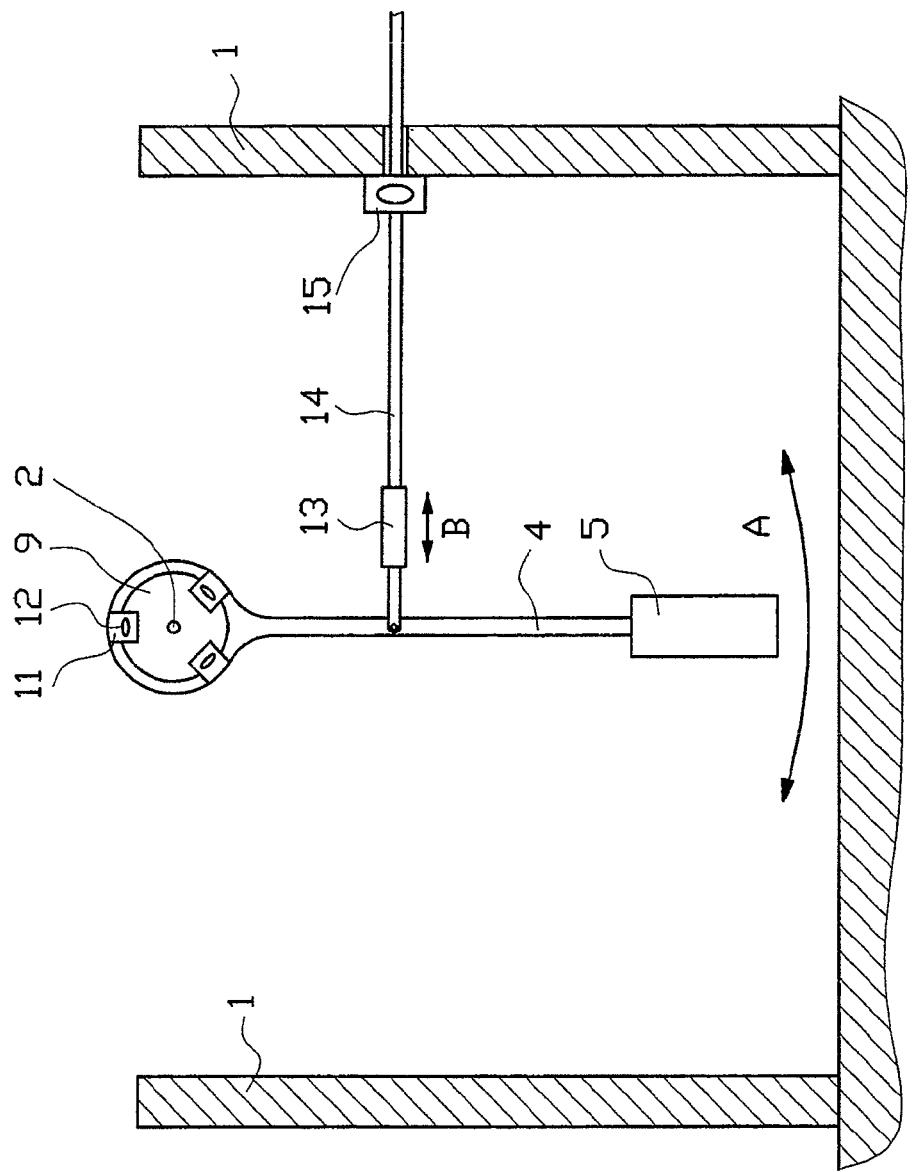
FIG. 1 is a schematic elevation view of the device according to an embodiment of the invention.

The device shown in FIG. 1 has at least one rigid pendulum, which is supported on a continuous shaft 2. For the sake of simplicity, in FIG. 1 only one pendulum is shown, formed by a pendulum rod 4 and a pendulum weight 5. As can be seen directly from FIGS. 1, 2, 4 and 6, the pendulum axis is located in the axis of rotation of the shaft 2. The transmission of force from the shaft 2 to a generator, not shown in FIG. 1, for generating electrical energy is effected via a shaft disk 9, which is rigidly connected to the shaft 2. The pendulum is equipped with gripper jaws 12, by way of which the transmission of force from the pendulum to the shaft disk 9 is regulated. The gripper jaws 12 are located in a jaw caliper 11 fitting around the shaft disk 9. By means of a drive cylinder 13, which is movable back and forth in the direction of the arrow B, the pendulum is set into an oscillating motion, which is typical for a pendulum, along the oscillation path A. To that end, the drive cylinder is connected via a push rod 14 to the pendulum rod 4 and to a building 1. The shaft 2 is also rotatably supported (not shown in FIG. 1) in the building. Since because of the deflection of the pendulum the spatial distances and angles between the engagement point of the push rod 14 with the pendulum rod 4 and of the push rod 14 with the building 1 are variable, the push rod 14 is pivotably connected to the pendulum rod 4 and has the same kind of pivotable connection, in the form of a push rod fixation 15, with the building 1. If the drive cylinder is then periodically subjected to energy, for instance in the form of compressed air, hydraulics, or the like, the pendulum oscillates and absorbs kinetic energy, as well as potential energy in the earth's field of gravity. The potential energy is converted into kinetic energy as soon as the pendulum swings back from an outward-deflected position into a bottom position. If in this phase the gripper jaws 12 engage the shaft disk 9, then by means of the pendulum motion, the shaft 2 is set into motion as well.

Since a uniform rotation of the shaft 2 is to be effected, the gripper jaws 12 allow a certain amount of slip, if the pendulum is swinging too slowly or in the opposite direction from the desired direction of rotation of the shaft 2.

The drive cylinder 13 for driving the pendulum can be a hydraulic cylinder, a pneumatic cylinder, and so forth. In general, any form of energy can be used here, such as the potential energy of natural or artificial water vapor, pushes, thrust from a human or an animal, and the like. The energy can be in pulselike form or in the form of elongated pulses or can have been exerted beforehand in such a form. If electrical energy in pulselike form is present, it can first be converted by the device into kinetic energy (pendulum oscillation) and then into constant electrical energy. The form of drive of the cylinders, along with the energy storage in oscillating pendulums, leads to a conversion of short, strong energy pulses into a constant electrical energy form of somewhat lesser magnitude.

Figure 3:
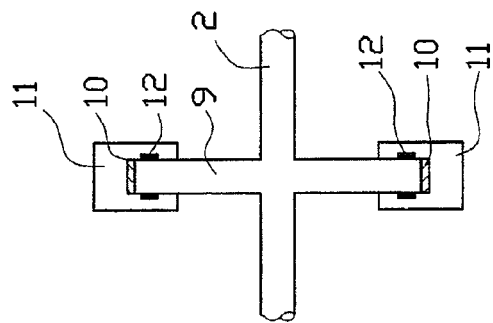
FIG. 3 is a side view of the suspension of FIG. 2.
Figure 2:
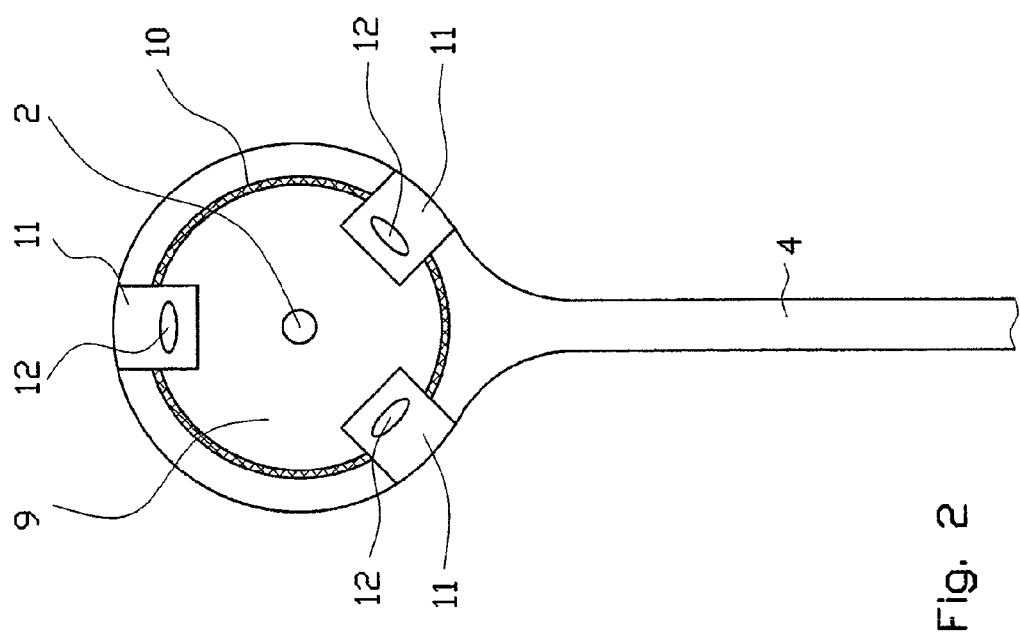
FIG. 2 shows a suspension of the pendulum.

In FIG. 2, the end of the pendulum rod 4 connected to the shaft 2 forms a ring, which with a joint 10, for instance in the form of a ball bearing, encloses the shaft disk 9 of the shaft 2. The ring has jaw calipers 11, whose gripper jaws can be pressed against the shaft disk 9. In FIG. 3, a sectional side view of the device of FIG. 2, that the shaft disk 9 is shown to be rigidly connected to the shaft 2.

Figure 4:
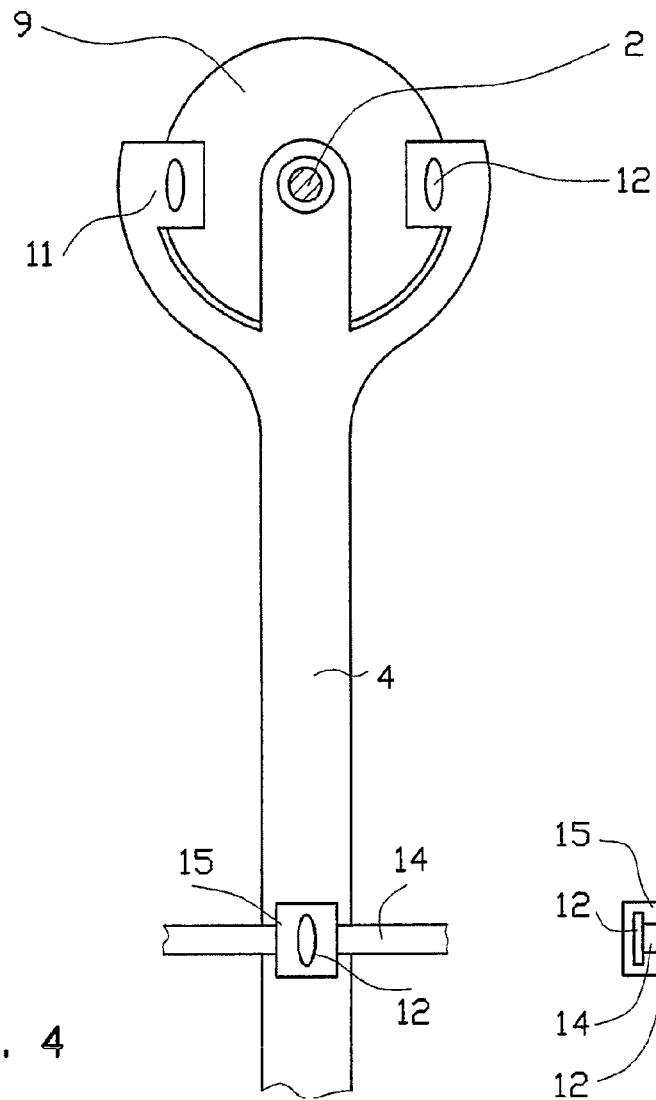
FIG. 4 shows a suspension of the pendulum.
Figure 5:
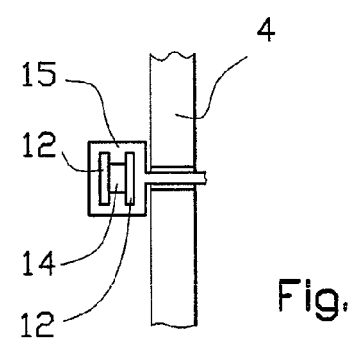
FIG. 5 is a side view of a connection of the drive cylinder to the pendulum rod.

In FIG. 4, the corresponding end of the pendulum rod 4 is U-shaped or forklike and fits around the shaft disk 9. In this version, the pendulum rod 4 is rotatably connected directly to the shaft. In FIGS. 4 and 5, the push rod fixation 15 is located on the pendulum rod 4. The push rod fixation 15 differs from a joint in having gripper jaws 12, which are also provided here. As a result, the pendulum can be fixed (for instance during pauses in operation) in the bottom position or in a deflected position, without the drive cylinder 13 having to be subjected to a pressure value for that purpose.

Figure 6:
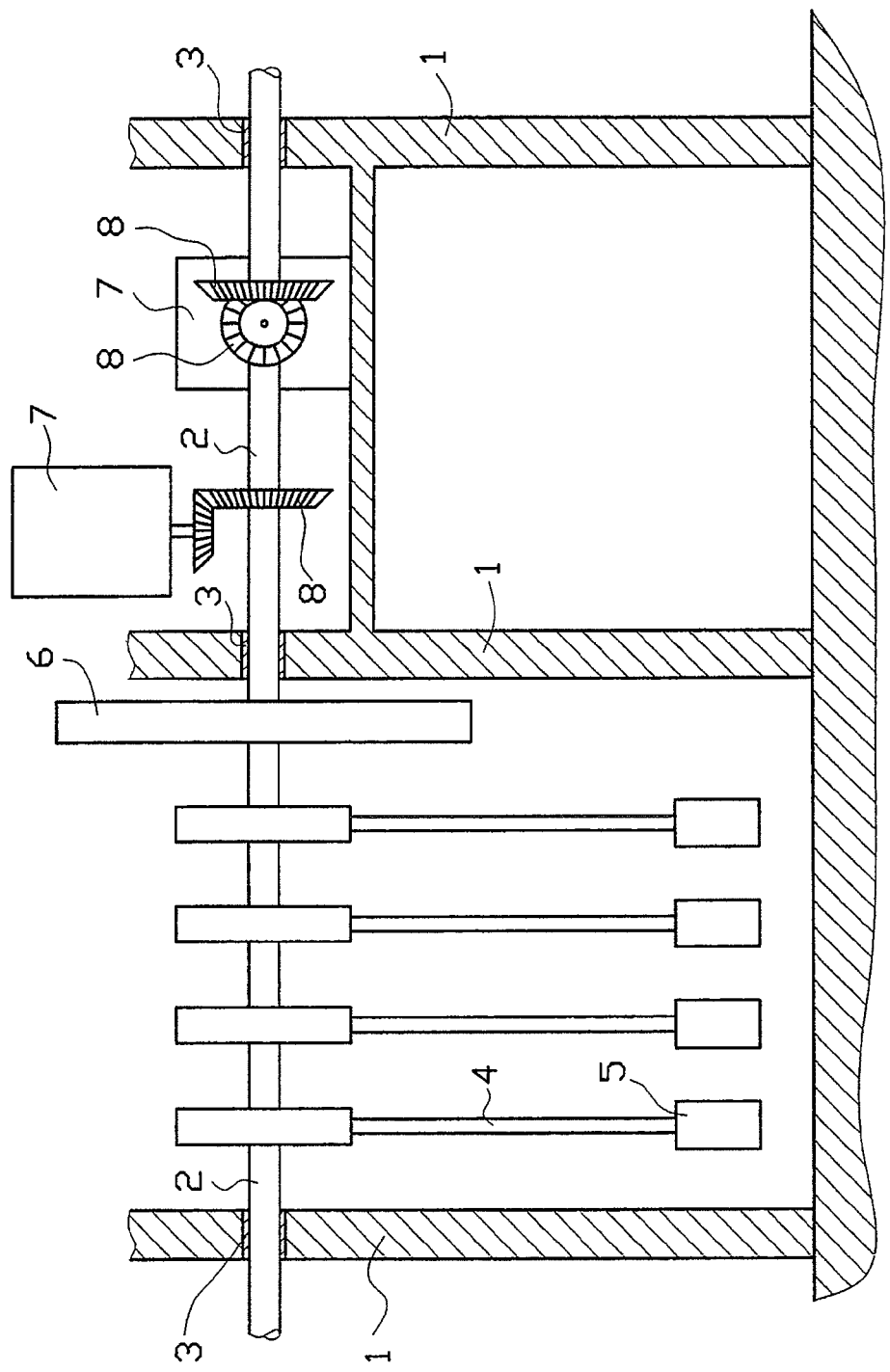
FIG. 6 is a side view of the device of the invention.

In FIG. 6, the device is shown with pendulums, four of them for example, suspended parallel on a shaft 2. The shaft 2 is connected in shaft bearings 3 to the building 1. Each pendulum is connected to its own respective drive cylinder, not shown here. Energy-generating generators 7 are driven via the shaft 2, for instance via conical gear wheels 8. By means of four phase-offset oscillating pendulums, it is ensured that the centrifugal-force machine can operate in a continuous-duty mode. In addition, a large-mass flywheel 6 can promote smooth running of the shaft 2, since the flywheel damps or buffers the temporary energy inputs from individual pendulums.

Figure 8:
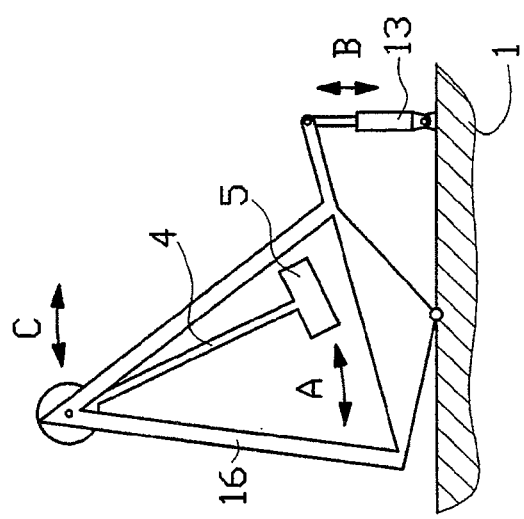
FIGS. 7 and 8 show a schematic elevation view of a second embodiment of the invention.
Figure 7:
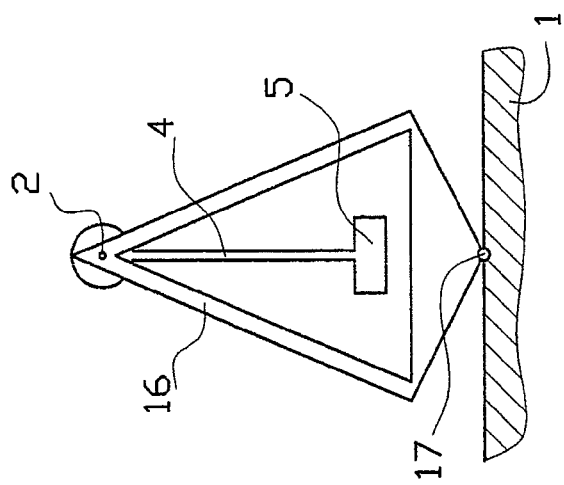

In a second embodiment of the invention, shown in FIGS. 7 and 8, the pendulum rod 4 is suspended in a frame 16 and in turn drives a shaft 2 located in the axis of the pendulum. The frame 16 is seated on a tilt axis 17 on the base of a building 1, frame construction, table, or the like. The tilt axis 17 can also be embodied as a joint or, in a simpler form, as a wedge placed on a level surface. The geometry of the frame 16 enables it to tilt about the tilt axis 17. Accordingly, in FIG. 8, a drive cylinder 13 is pivotably connected to the frame 16, and the drive cylinder executes a motion in the direction of the arrow B, as a result of which the frame 16 periodically oscillates along the tilting path C and in the process transmits the oscillatory motion to the pendulum rod 4. The frame 16 can also be made to tilt by some other kind of periodic or nearly periodic forms of energy. The only precondition is that the tilting force is input into the frame 16 over a distance that is remote from the tilt axis 17, in order to form a lever arm. It is advantageous here that instead of a heavy pendulum weight 5, it is a comparatively lower-mass frame 16 that has to be deflected at the onset of the pendulum motion. The pendulum weight 5 is then made to move by the force of gravity and can immediately drive a generator (not shown). The energy conversion can therefore be performed at a standstill, and complicated coupling via gripper jaws 12, jaw calipers 11 and a shaft disk 9 along with a controller can be omitted. Instead, the pendulum rod 4 is connected to the shaft 2 via a conventional ratchet system. The ratchet system allows the pendulum to swing freely in one direction and connects it rigidly in the other direction to the shaft 2, in order to transmit the rotational energy of the pendulum to the shaft 2 and to the generator 7 connected to it.

Figure 9:
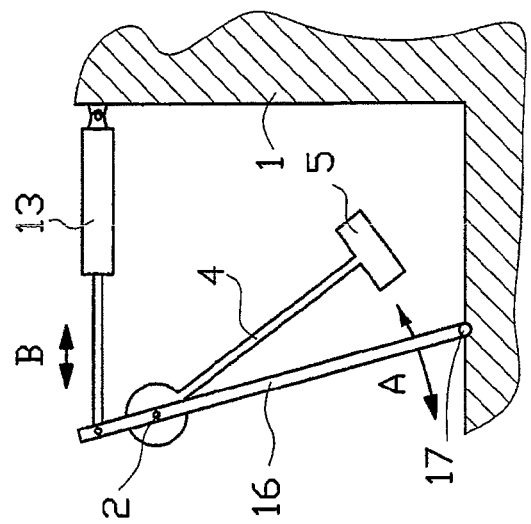
FIG. 9 is a schematic side view of a third embodiment.
Figure 10:
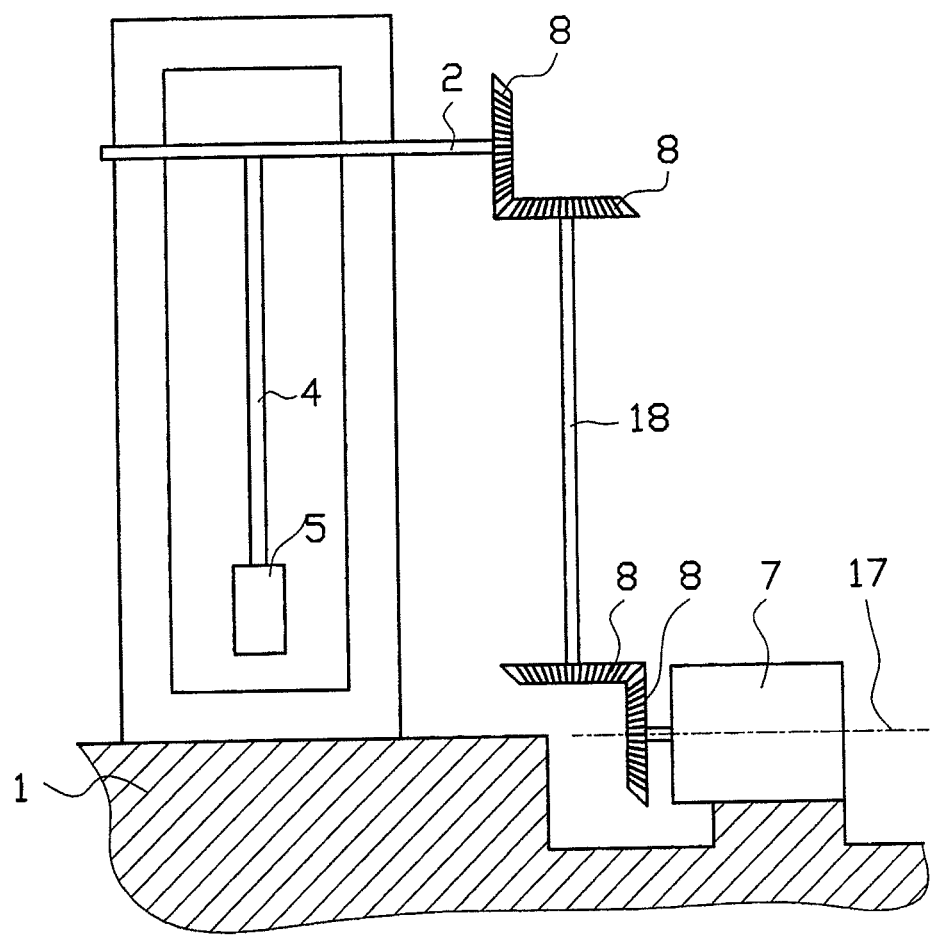
FIG. 10 is a schematic front view of the third embodiment.

In FIG. 9, the drive cylinder is pivotably connected to the frame 16 above the shaft 2. Even slight deflections of the frame 16 can, given suitable periodic triggering of the drive cylinder 13, lead to rocking of the pendulum, from which more energy is then drawn. The frame 16 is shown from the side in FIG. 9 and from the front in FIG. 10. As shown in FIG. 10, the rotational energy of the pendulum can be sent onward to a generator 7 via the shaft 2 by means of further shafts and conical gear wheels 8. It should be noted here that the pendulum system, including the frame 16, swings back and forth continuously about the tilt axis 17. One possible way of drawing the rotational energy via shafts is shown in FIG. 10. A second shaft 18 guided jointly with the rocking frame 16 moves a generator 7, whose axis is located in the tilt axis 17 of the frame 16. In this way, the generator 7 can be stationary, and rotational energy of the pendulum can be imparted via the shaft 2 that rocks jointly with the frame 16.

It is understood that the exemplary embodiments described can be modified in various ways within the scope of the concept of the invention, for instance with regard to the type of drive of the pendulum or pendulums, the means for converting the shaft rotation into electrical energy, or the coupling of the pendulum and shaft.

The invention claimed is:

1. A device for converting kinetic energy into electrical energy, comprising:
    a pendulum which includes a pendulum rod and a pendulum weight and is suspended in oscillating fashion on a shaft;
    a generator connected to the shaft and configured to convert rotational energy of the pendulum into electrical energy; and
    means for rigidly connecting the pendulum to the shaft when the pendulum oscillates in a predetermined direction,
    wherein the pendulum is suspended in a tiltable frame, and arranged so that a tilting of the tiltable frame transmits oscillatory motion to the pendulum, and
    wherein a pendulum drive drivable member is connected to the frame and arranged, when driven, to move and to thereby tilt the frame.

2. The device according to claim 1, wherein the shaft has a shaft disk fixedly connected to the shaft, and the pendulum rod has at least one jaw caliper and at least one gripper jaw retained movably in the jaw caliper, by which gripper jaw the pendulum rod can be connected rigidly to the shaft via the shaft disk.

3. The device according to claim 1, wherein the pendulum rod is connected rotatably to the shaft.

4. The device according to claim 1, wherein the pendulum rod is connected rotatably to the shaft disk.

5. The device according to claim 1,
    wherein:
    the pendulum rotates about a pendulum axis of rotation and the tiltable frame rotates about a tilt axis,
    the tilt axis of the tiltable frame is located parallel to the pendulum axis, and
    the drivable member comprises a push rod of a hydraulic or pneumatic drive cylinder supplied with energy for the pendulum drive.

6. The device according to claim 5, wherein the drive cylinder is periodically actuatable via an associated regulator.

7. The device according to claim 6, the device further comprising a flywheel drivable by the shaft in order to effect an enhanced uniform rotary speed of the shaft.

8. The device according to claim 7, wherein the device has two or more pendulums, which are located parallel on the shaft.

* * * * *